United States Patent [19]

Brundage

[11] 4,185,841
[45] Jan. 29, 1980

[54] EXTERNAL SWIVEL JOINT SEAL

[76] Inventor: Ben W. Brundage, 4390 Piedmont Ave., Oakland, Calif. 94611

[21] Appl. No.: 956,023

[22] Filed: Oct. 30, 1978

[51] Int. Cl.² .................... F16J 15/34; F16L 55/00
[52] U.S. Cl. .................... 277/167.5; 277/96.2; 277/DIG. 6; 285/276; 285/281; 285/DIG. 11; 285/DIG. 19
[58] Field of Search ............ 285/272, 275, 276, 278, 285/280, 281, DIG. 11, DIG. 19, 349; 277/167.5, DIG. 6, 38, 39, 96.2, 92, 125, 228

[56] References Cited

U.S. PATENT DOCUMENTS

| 2,382,375 | 8/1945 | Allen et al. | 285/276 X |
| 2,918,312 | 12/1959 | Filstrup | 285/349 X |
| 2,927,804 | 3/1960 | Snyder et al. | 285/276 X |
| 3,347,570 | 10/1967 | Roessler | 285/276 X |
| 3,363,919 | 1/1968 | Brazell | 285/276 |
| 3,441,292 | 4/1969 | Gross | 285/349 X |
| 3,799,589 | 3/1974 | Boelkins | 285/281 |

FOREIGN PATENT DOCUMENTS

| 589502 | 6/1947 | United Kingdom | 285/276 |
| 742555 | 12/1955 | United Kingdom | 285/276 |

OTHER PUBLICATIONS

*Mechanical Seals*, E. Mayer, Second Edition, (American Elsevier Publishing Co., Inc., 1972), pp. 21–22, copy in A.V. 241, U.S. Patent & Trademark Office.

Primary Examiner—Robert S. Ward, Jr.
Attorney, Agent, or Firm—Robert H. Eckhoff

[57] ABSTRACT

A rotary seal for a swivel joint is provided which is capable of standing substantially high internal pressure without leakage. Such swivel joints are widely used, for example, to prevent external leakage of products down the drain line in floating roof tanks. Also the sealing surfaces utilized are corrosion resistant to most acids.

1 Claim, 3 Drawing Figures

EXTERNAL SWIVEL JOINT SEAL

BACKGROUND OF THE INVENTION

Typical swivel joints are shown, for example, in the Arneson U.S. Pat. No. 3,372,948, the Fowler U.S. Pat. No. 3,438,653, and in my prior U.S. Pat. No. 3,186,737, as well as in Italian Pat. No. 651 220 and British Pat. No. 651 006.

SUMMARY OF THE INVENTION

It is in general the broad object of the present invention to provide a swivel joint construction in which the surfaces permitting rotation include, for example, a TEFLON washer which is movable between two VITON "O" rings. VITON is a trademark for fluoroelastomers. TEFLON is a trademark for tetrafluoroethylene fluorocarbon resins. The trademarks TEFLON and VITON are used in a generic sense and as embracing equivalent materials but to which another trademark may be applied.

The swivel fitting design, generally as shown, is typical of swivels now being manufactured. The exterior rotary seal can be applied to several swivel fittings now on the market. The majority of the swivel fittings now available have internal synthetic rubber or TEFLON seals or packing rings that depend on their contact against metal for sealing. The metal corrodes and pits however, which will allow leakage to occur. The seal of the present invention obviates this failure for the VITON and TEFLON elements are immune to corrosion.

BRIEF DESCRIPTION OF THE DRAWINGS

In the drawings accompanying and forming a part hereof.

DESCRIPTION OF THE PREFERRED EMBODIMENT

Figure 1:
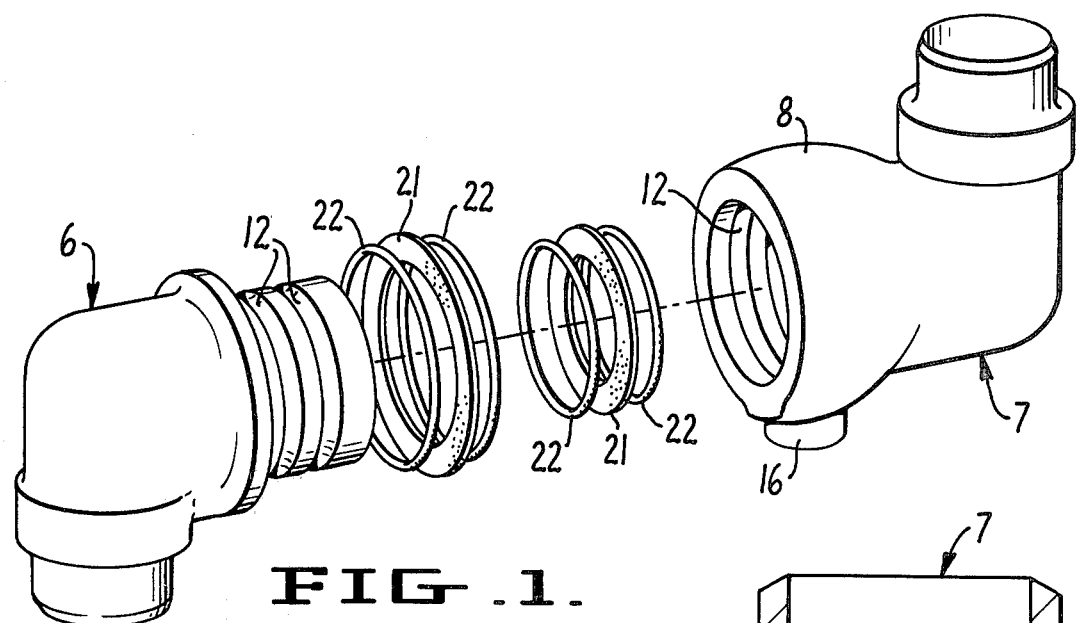
FIG. 1 is an exploded view showing in perspective the several elements going to make up the seal.
Figure 2:
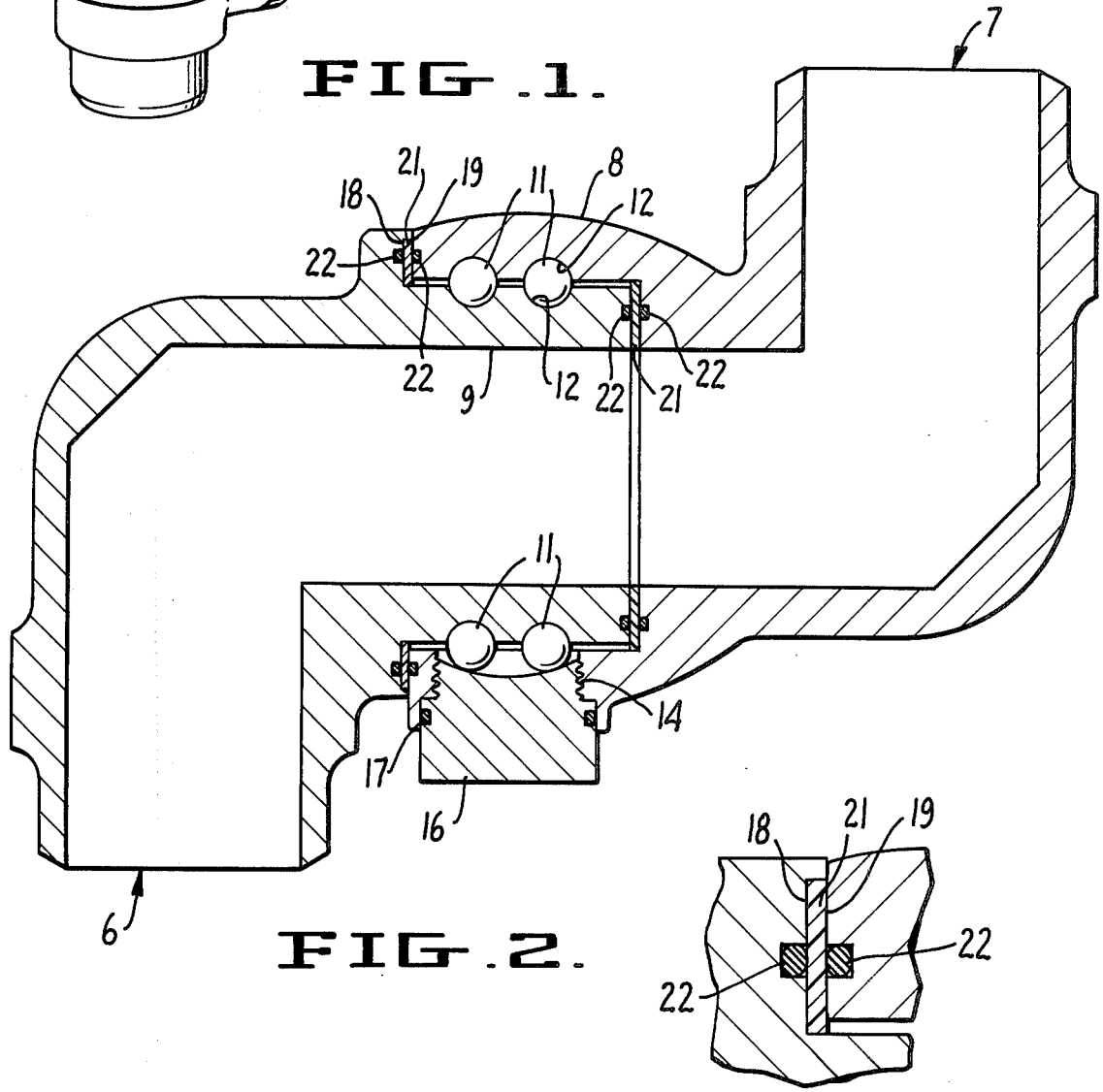
FIG. 2 is a section taken transversely through the seal in assembled form.

Referring to the accompanying drawings, the swivel joint is shown typically as including two mating elements 6 and 7. These can be suitably connected on either side to a pipeline, hose or the like so that a fluid can pass through the assembled swivel joint. The element 7 includes an outer tubular receptacle 8 into which a matching extension 9 on element 6 projects. Ball bearings 11 are provided in suitable raceways 12. The balls are inserted in place through an opening 14 on one side of the element 7, the opening being threaded and a screw plug 16 is utilized to close the opening 14. The plug is sealed in place by an O-ring 17.

In accordance with this invention, each of the pairs of mating surfaces 18 and 19 permits swiveling of the joint. Each of the mating surfaces includes a TEFLON washer 21 having opposite VITON "O" rings 22 on either side thereof. It is to be noted that the sealed matching surfaces 18 and 19 are in very close relationship so that the pressure applied to the TEFLON washers 21 cannot deform or eject the washer because of pressure application.

With the VITON "O" rings fitting snugly against the TEFLON washer, the sealing surfaces are corrosion resistant to most acids and other fluids such as sea water. The rotation of VITON "O" rings 22 against the TEFLON washers 21, which has a low coefficient of friction, ensures that virtually no wear will occur on the "O" rings during rotation. A particular application of the seals is extremely useful in acid loading applications because the absence of corrosion ensures that there will be no leakage of acid and consequently no squirting of acid onto an operator from internal packing failures.

Figure 3:
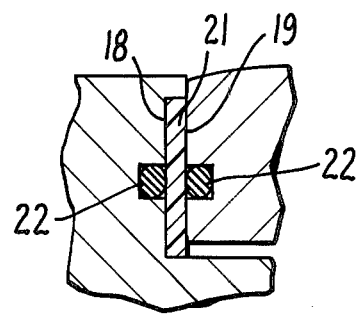
FIG. 3 is an enlarged view of a typical seal construction.

As is shown in FIG. 3, an exterior rotary seal is provided for a swivel joint which can withstand pressure from the outside as well as internally. It has two functions, one to prevent leakage of product into the bearing area as in a water drain line in a floating roof tank, or preventing leakage of salt water into the bearings of swivel fittings such as submerged "choke and kill" lines in offshore drilling and production platforms.

Another function of the rotary seal is to act as a secondary internal pressure seal if the primary seal or packing unit adjacent to the annulus fails and leaks through the bearing area. This secondary function is advantageous in hazardous applications as in acid loading operations or flexible manifold lines. This ensures that there will be no leakage of acid or product squirting onto an operator from internal packing failures. Also in "choke and kill" lines it will perform as a secondary seal under high pressure applications.

I claim:

1. A seal for two elements rotating one with respect to the other and having mating surfaces movable one with respect to the other, a TEFLON washer provided between the mating surfaces with an "O" ring on each side thereof in each of the elements providing the mating surfaces, the washer being made of TEFLON and the "O" rings made of VITON.

* * * * *